United States Patent [19]
Thomas, III

[11] Patent Number: 6,022,475
[45] Date of Patent: Feb. 8, 2000

[54] BRUSH CLEANING DEVICE

[76] Inventor: Eli L. Thomas, III, 562 Chalmers, Detroit, Mich. 48215

[21] Appl. No.: 09/054,240

[22] Filed: Apr. 2, 1998

[51] Int. Cl.[7] .................................................. B01D 21/18
[52] U.S. Cl. ........................ 210/241; 210/528; 210/530; 210/541; 15/246.5
[58] Field of Search ................................... 210/241, 528, 210/530, 541, 525; 15/246.5

[56] References Cited

U.S. PATENT DOCUMENTS

| | | | |
|---|---|---|---|
| 2,427,092 | 9/1947 | Kamp | 210/530 |
| 4,830,748 | 5/1989 | Hall | 210/528 |
| 4,876,010 | 10/1989 | Riddle | 210/528 |
| 4,978,447 | 12/1990 | Hall | 210/530 |
| 5,423,980 | 6/1995 | Casper | 210/530 |
| 5,720,890 | 2/1998 | Caliva | 210/528 |

*Primary Examiner*—Christopher Upton

[57] ABSTRACT

An apparatus is provided for cleaning a water treatment tank. The apparatus includes a frame support having post mounted at a central extent of the upper surface of the water treatment tank and extending upwardly therefrom. A horizontally oriented arm has an inboard end coupled to the post. An outboard brush assembly is equipped with a rod coupled to an outboard end of the arm of the frame support and extended downwardly and radially outward therefrom. A vertically oriented brush is coupled to a second end of the rod for cleaning an inner surface of the peripheral lip of the water treatment tank. Also included is a plurality of inboard brush assemblies for cleaning the flanges of the water treatment tank.

8 Claims, 4 Drawing Sheets

BRUSH CLEANING DEVICE

BACKGROUND OF THE INVENTION

1. Field of the Invention

The present invention relates to water treatment tank cleaners and more particularly pertains to a new brush cleaning device for cleaning a water treatment tank.

2. Description of the Prior Art

The use of water treatment tank cleaners is known in the prior art. More specifically, water treatment tank cleaners heretofore devised and utilized are known to consist basically of familiar, expected and obvious structural configurations, notwithstanding the myriad of designs encompassed by the crowded prior art which have been developed for the fulfillment of countless objectives and requirements.

Known prior art water treatment tank cleaners include U.S. Pat. No. 4,046,693; U.S. Pat. No. 4,876,010; U.S. Pat. No. 4,830,748; U.S. Pat. No. 3,977,974; U.S. Pat. No. 4,978,447; and U.S. Pat. No. Des. 273,621.

In these respects, the brush cleaning device according to the present invention substantially departs from the conventional concepts and designs of the prior art, and in so doing provides an apparatus primarily developed for the purpose of cleaning a water treatment tank.

SUMMARY OF THE INVENTION

In view of the foregoing disadvantages inherent in the known types of water treatment tank cleaners now present in the prior art, the present invention provides a new brush cleaning device construction wherein the same can be utilized for cleaning a water treatment tank.

The general purpose of the present invention, which will be described subsequently in greater detail, is to provide a new brush cleaning device apparatus and method which has many of the advantages of the water treatment tank cleaners mentioned heretofore and many novel features that result in a new brush cleaning device which is not anticipated, rendered obvious, suggested, or even implied by any of the prior art water treatment tank cleaners, either alone or in any combination thereof.

To attain this, the present invention generally comprises a water treatment tank having an elevated upper surface with a circular configuration and a peripheral lip coupled to an outer periphery of the upper surface and extending upwardly therefrom. The upper surface has a plurality of annular flanges coupled thereto in concentric relationship therewith. As shown in FIGS. 1 & 6, the annular flanges extend upwardly from the upper surface for defining a plurality of concentric channels. Each of the annular flanges has teeth formed along an upper edge thereof. The water treatment tank further includes an annular, hollow outer guide coupled along a top edge of an inner surface of the peripheral lip. For facilitating the mounting of the outer guide to the peripheral lip, the outer guide includes a rear face with a plurality of apertured tabs coupled thereto and extending upwardly and downwardly therefrom. Coupled to upper and lower edges of the rear face is a top and bottom face, respectfully, both of which extend radially inward therefrom. As shown in FIGS. 1 & 6, a front face of the outer guide is coupled between the top face and the bottom face for defining an interior space. The front face has a horizontally oriented slot formed along an entire length thereof. Also included is a frame support having a vertically oriented post mounted at a central extent of the upper surface of the water treatment tank and extending upwardly therefrom. A horizontally oriented arm has an inboard end coupled to the post with an angle brace coupled between the post and the arm. FIGS. 1, 5 & 6 show a guide assembly having a mount including an angled member having a first end fixedly coupled to an outboard end of the arm of the frame support. A second end of the mount extends upwardly and radially outward from the arm. Coupled to the second end of the angled member is first end of a horizontal member. Such horizontal member extends radially outward in parallel relationship with the arm of the frame support. Further, the second end of the horizontal member extends within the slot of the outer guide of the water treatment tank. The guide assembly also includes a neoprene wheel rotatably coupled to a second end of the horizontal member of the guide assembly about a horizontal axis. In use, the wheel is rotatable within the interior space along the bottom face of the outer guide of the water treatment tank. As such, the arm is supported as it rotates about the post of the frame support. FIG. 3 depicts an outboard brush assembly including a rod hingably coupled to the outboard end of the arm of the frame support and extending downwardly and radially outward therefrom. A vertically oriented rectangular brush is hingably coupled at a central extent thereof to a second end of the rod. A spring is coupled between the arm of the frame support and a first end of the rod of the outboard brush assembly which is elevated above the arm. By this structure, the spring serves for urging the rectangular brush of the outboard brush assembly against the inner surface of the peripheral lip of the water treatment tank. Finally, a plurality of inboard brush assemblies are provided each including two rectangular vertical brushes. Each inboard brush assembly has a vertically oriented arcuate support hingably coupled between a rear face of the associated rectangular vertical brush of the inboard brush assembly and a bottom of the arm of the frame support. A cross support is coupled between central extents of the corresponding arcuate supports. As such, the vertical brushes of the inboard brush assemblies each abut a side of a corresponding one of the annular flanges of the water treatment tank for cleaning purposes. Each inboard brush assembly further includes a rectangular horizontal brush having a T-shaped support associated therewith. Note FIG. 6. As shown in such Figure, the T-shaped support has a first end coupled to a rear face of the horizontal brush. A pair of opposed ends of the T-shaped support are coupled to central extents of the arcuate supports of an associated pair of vertical brushes. The horizontal brush thus abuts the upper surface of the water treatment tank within one of the channels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new brush cleaning device apparatus and method which has many of the advantages of the water treatment tank cleaners mentioned heretofore and many novel features that result in a new brush cleaning device which is not anticipated, rendered obvious, suggested, or even implied by any of the prior art water treatment tank cleaners, either alone or in any combination thereof.

It is another object of the present invention to provide a new brush cleaning device which may be easily and efficiently manufactured and marketed.

It is a further object of the present invention to provide a new brush cleaning device which is of a durable and reliable construction.

An even further object of the present invention is to provide a new brush cleaning device which is susceptible of a low cost of manufacture with regard to both materials and labor, and which accordingly is then susceptible of low prices of sale to the consuming public, thereby making such brush cleaning device economically available to the buying public.

Still yet another object of the present invention is to provide a new brush cleaning device which provides in the apparatuses and methods of the prior art some of the advantages thereof, while simultaneously overcoming some of the disadvantages normally associated therewith.

Still another object of the present invention is to provide a new brush cleaning device for cleaning a water treatment tank.

Even still another object of the present invention is to provide a new brush cleaning device that includes a frame support having post mounted at a central extent of the upper surface of the water treatment tank and extending upwardly therefrom. A horizontally oriented arm has an inboard end coupled to the post. An outboard brush assembly is equipped with a rod coupled to an outboard end of the arm of the frame support and extended downwardly and radially outward therefrom. A vertically oriented brush is coupled to a second end of the rod for cleaning an inner surface of the peripheral lip of the water treatment tank. Also included is a plurality of inboard brush assemblies for cleaning the flanges of the water treatment tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
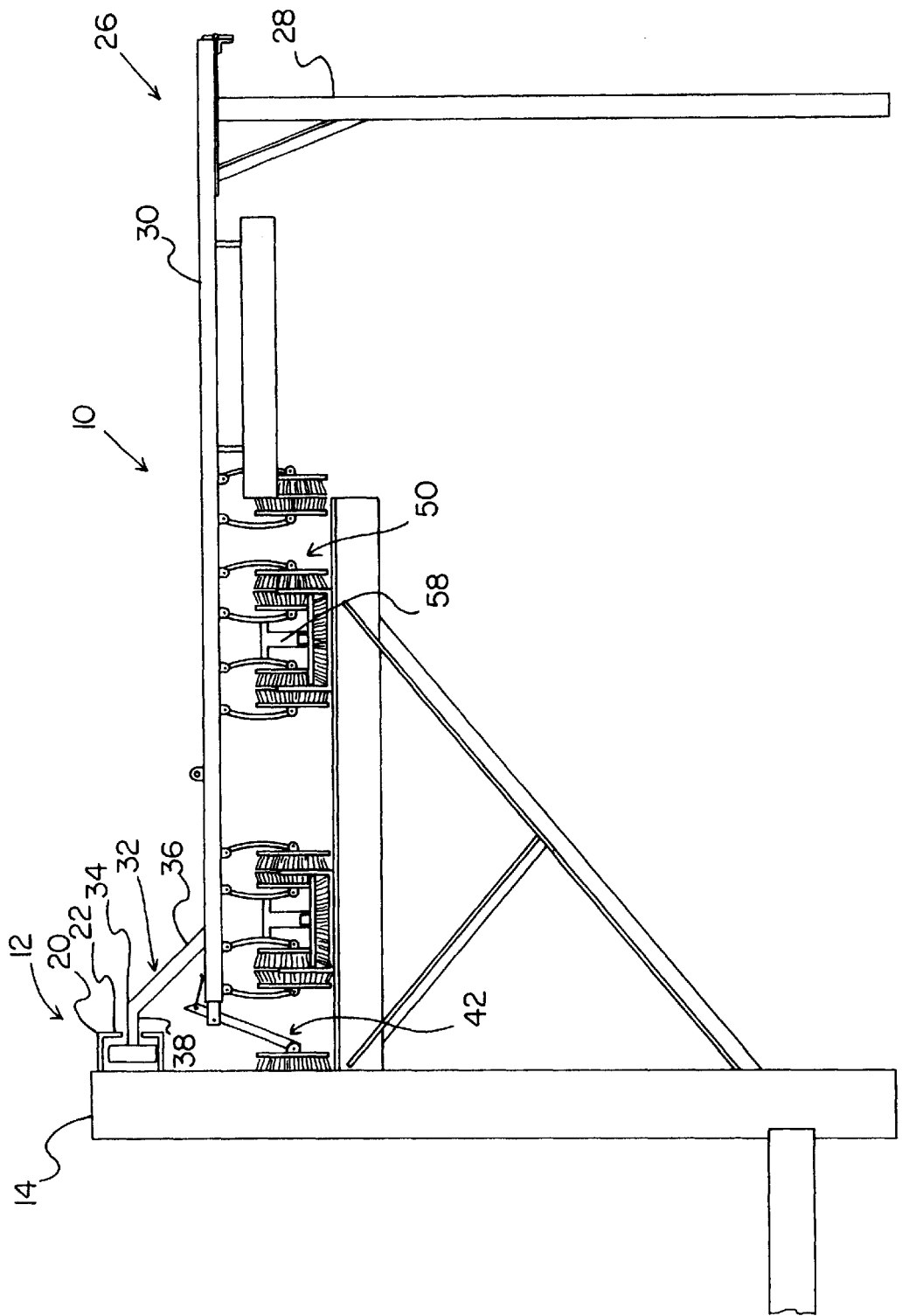
FIG. 1 is a side view of a new brush cleaning device according to the present invention.
Figure 2:
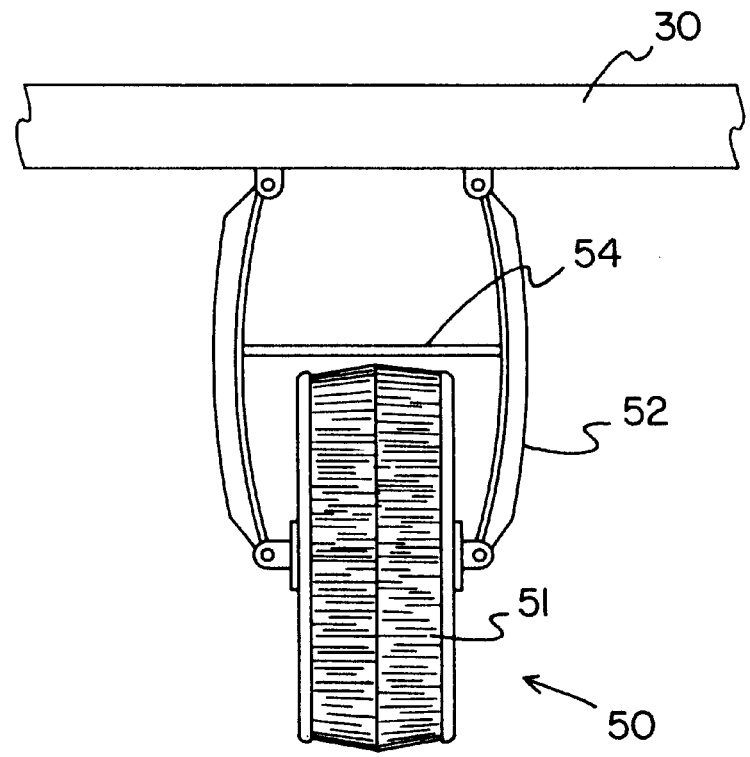
FIG. 2 is a front view of the vertical brushes of one of the inboard brush assemblies of the present invention.

With reference now to the drawings, and in particular to FIGS. 1 through 6 thereof, a new brush cleaning device embodying the principles and concepts of the present invention and generally designated by the reference numeral 10 will be described.

Figure 6:
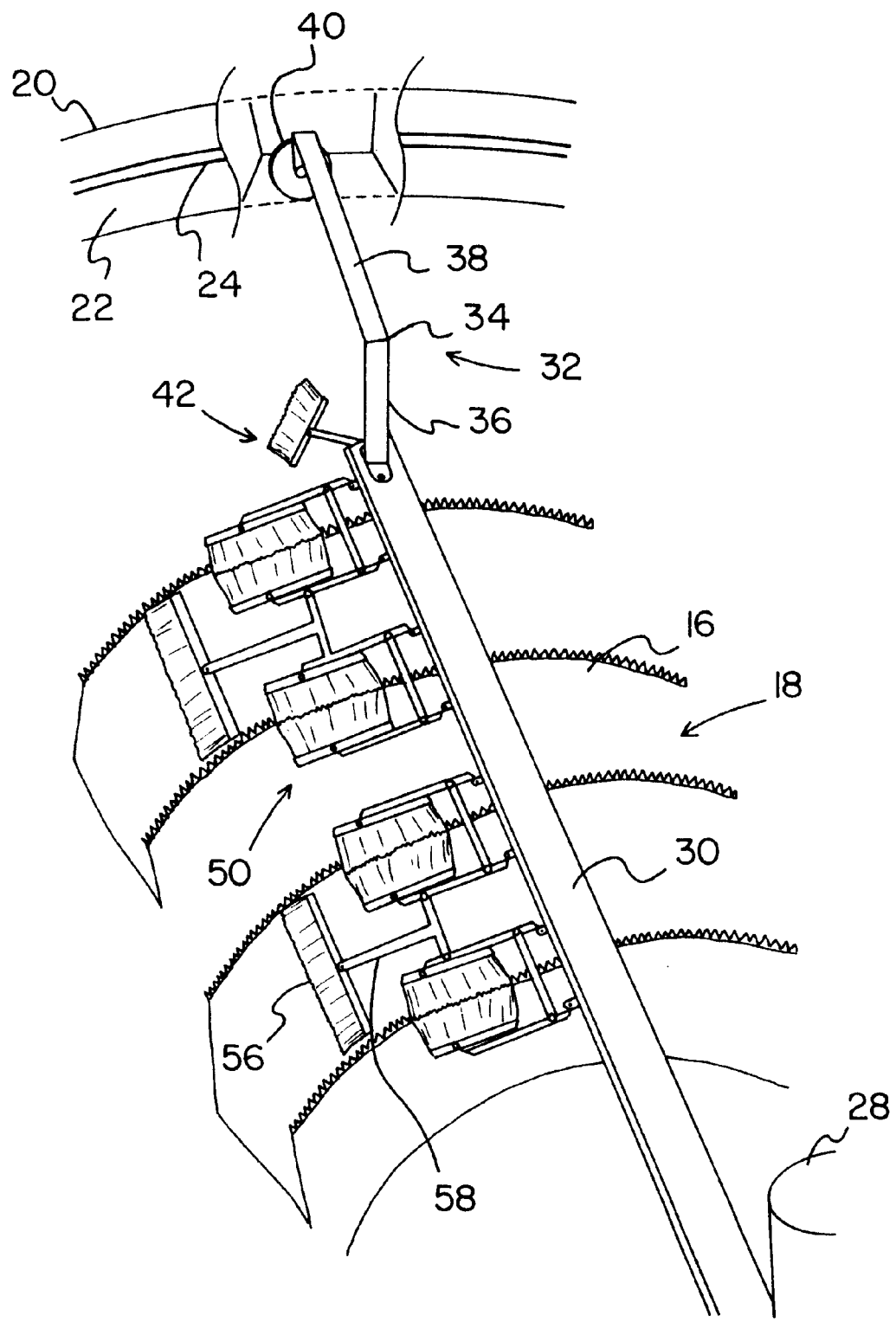
FIG. 6 is a perspective view of the present invention.

The present invention, designated as numeral 10, includes a water treatment tank 12 having an elevated upper surface with a circular configuration and a peripheral lip 14 coupled to an outer periphery of the upper surface and extending upwardly therefrom. The upper surface has a plurality of annular flanges 16 coupled thereto in concentric relationship therewith. As shown in FIGS. 1 & 6, the annular flanges extend upwardly from the upper surface for defining a plurality of concentric channels 18. Each of the annular flanges has teeth formed along an upper edge thereof.

The water treatment tank further includes an annular, hollow outer guide 20 coupled along a top edge of an inner surface of the peripheral lip. For facilitating the mounting of the outer guide to the peripheral lip, the outer guide includes a rear face with a plurality of apertured tabs coupled thereto and extending upwardly and downwardly therefrom. Coupled to upper and lower edges of the rear face is a top and bottom face, respectfully, both of which extend radially inward therefrom. As shown in FIGS. 1 & 6, a front face 22 of the outer guide is coupled between the top face and the bottom face for defining an interior space. The front face has a horizontally oriented slot 24 formed along an entire length thereof for reasons that will soon become apparent.

Also included is a rotatable frame support 26 having a vertically oriented post 28 mounted at a central extent of the upper surface of the water treatment tank and extending upwardly therefrom. A horizontally oriented arm 30 has an inboard end coupled to the post with an angle brace coupled between the post and the arm.

Figure 5:
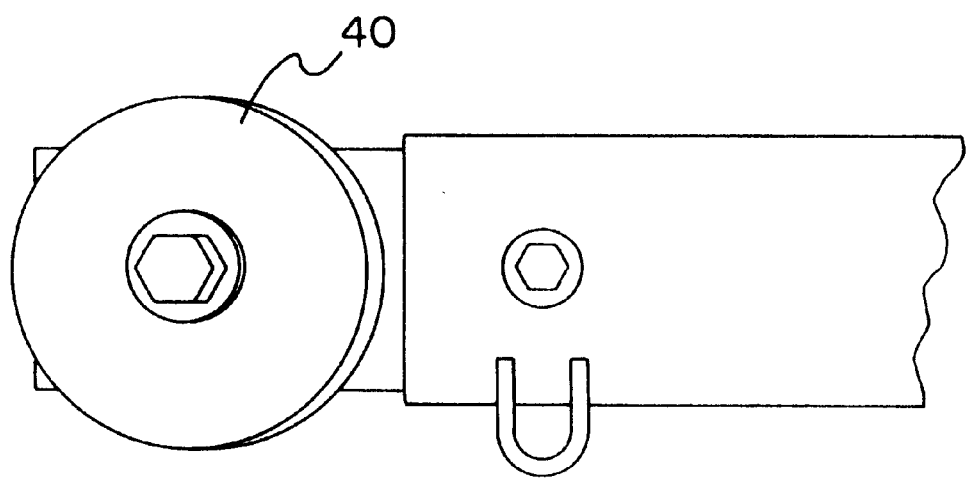
FIG. 5 is an illustration of the wheel of the guide assembly of the present invention.

FIGS. 1, 5 & 6 show a guide assembly 32 having a mount 34 including an angled member 36 having a first end fixedly coupled to an outboard end of the arm of the frame support. A second end of the mount extends upwardly and radially outward from the arm. Coupled to the second end of the angled member is first end of a horizontal member 38. Such horizontal member extends radially outward in parallel relationship with the arm of the frame support. Further, the second end of the horizontal member extends within the slot of the outer guide of the water treatment tank.

The guide assembly also includes a neoprene wheel 40 rotatably coupled to a second end of the horizontal member of the guide assembly about a horizontal axis. In use, the wheel is rotatable within the interior space along the bottom face of the outer guide of the water treatment tank. As such, the arm is supported as it rotates about the post of the frame support.

Figure 3:
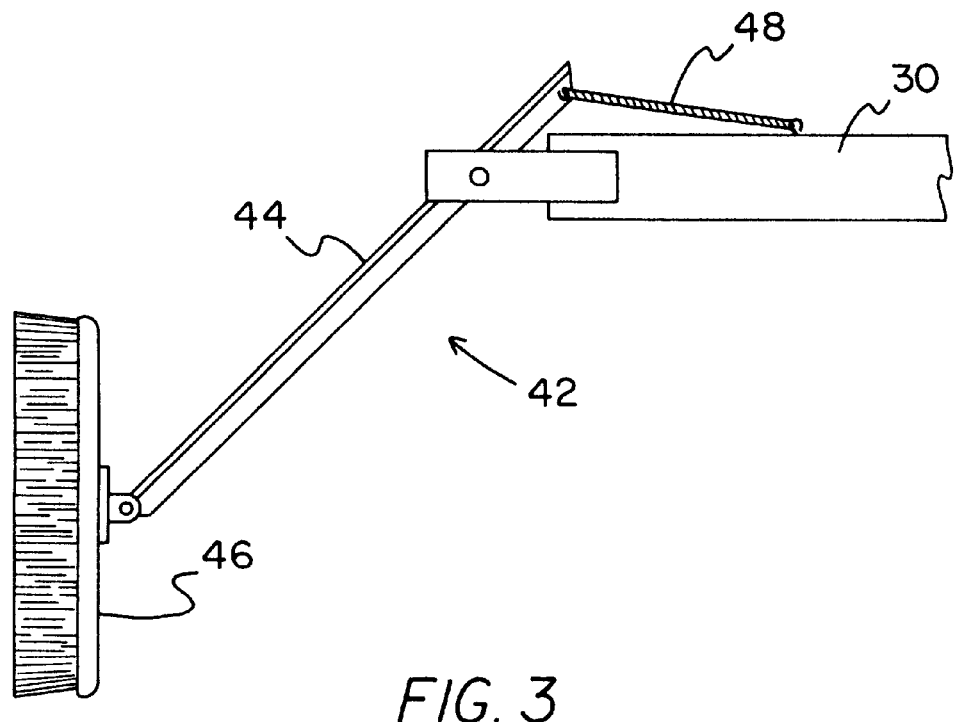
FIG. 3 is a side view of the outboard brush assembly of the present invention.
Figure 4:
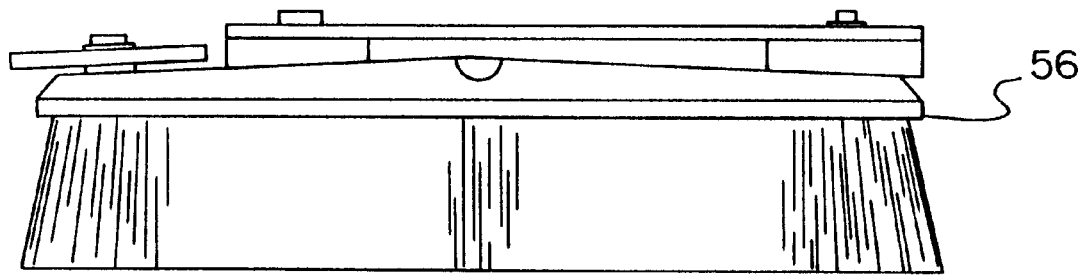
FIG. 4 is a front view of the horizontal brush of one of the inboard brush assemblies of the present invention.

FIG. 3 depicts an outboard brush assembly 42 including a rod 44 hingably coupled to the outboard end of the arm of the frame support and extending downwardly and radially outward therefrom. A vertically oriented rectangular brush 46 is hingably coupled at a central extent thereof to a second end of the rod. A spring 48 is coupled between the arm of the frame support and a first end of the rod of the outboard brush assembly which is elevated above the arm. By this structure, the spring serves for urging the rectangular brush of the outboard brush assembly against the inner surface of the peripheral lip of the water treatment tank.

Finally, a plurality of inboard brush assemblies 50 are provided each including two rectangular vertical brushes 51. Each inboard brush assembly has a vertically oriented arcuate support 52 hingably coupled between a rear face of the associated rectangular vertical brush of the inboard brush assembly and a bottom of the arm of the frame support. A cross support 54 is coupled between central extents of the corresponding arcuate supports. As such, the vertical brushes of the inboard brush assemblies each abut a side of a corresponding one of the annular flanges of the water treatment tank for cleaning purposes.

Each inboard brush assembly further includes a rectangular horizontal brush 56 having a T-shaped support 58 associated therewith. Note FIG. 6. As shown in such Figure, the T-shaped support has a first end coupled to a rear face of the horizontal brush. A pair of opposed ends of the T-shaped support are coupled to central extents of the arcuate supports of an associated pair of vertical brushes. The horizontal brush thus abuts the upper surface of the water treatment tank within one of the channels.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for cleaning a water treatment tank comprising, in combination:

a water treatment tank including an elevated upper surface with a circular configuration and a peripheral lip coupled to an outer periphery of the upper surface and extending upwardly therefrom, the upper surface having a plurality of annular flanges coupled thereto in concentric relationship therewith and extending upwardly therefrom for defining a plurality of concentric channels at a common elevation, each of the annular flanges having teeth formed along an upper edge thereof, the water treatment tank further including an annular, hollow outer guide coupled along a top edge of an inner surface of the peripheral lip, the outer guide including a rear face with a plurality of apertured tabs coupled thereto and extending upwardly and downwardly therefrom for facilitating the mounting of the outer guide to the peripheral lip, a top face and a bottom face coupled to upper and lower edges of the rear face and extending radially inward, and a front face coupled between the top face and the bottom face for defining an interior space, wherein the front face has a horizontally oriented slot formed along an entire length thereof;

a frame support including a vertically oriented post mounted at a central extent of the upper surface of the water treatment tank and extending upwardly therefrom and a horizontally oriented arm having an inboard end coupled to the post with an angle brace coupled between the post and the arm;

a guide assembly having a mount including an angled member having a first end fixedly coupled to an outboard end of the arm of the frame support and a second end extending upwardly and radially outward therefrom, a horizontal member having a first end fixedly coupled to the second end of the angled member and extending radially outward in parallel relationship with the arm of the frame support and further extending within the slot of the outer guide of the water treatment tank, and a neoprene wheel rotatably coupled to a second end of the horizontal member of the guide assembly about a horizontal axis, wherein the wheel is rotatable within the interior space along the bottom face of the outer guide of the water treatment tank for supporting the arm as it rotates about the post of the frame support;

an outboard brush assembly including a rod hingably coupled adjacent to and spaced from a first end thereof to the outboard end of the arm of the frame support and extending downwardly and radially outward therefrom, a vertically oriented rectangular brush hingably coupled at a central extent thereof to a second end of the rod, and a spring coupled between the arm of the frame support and the first end of the rod of the outboard brush assembly for urging the rectangular brush of the outboard brush assembly against the inner surface of the peripheral lip of the water treatment tank; and a plurality of inboard brush assemblies each including two rectangular vertical brushes each having an arcuate support hingably coupled between a rear face of the associated rectangular vertical brush of the inboard brush assembly and a bottom of the arm of the frame support and a cross support coupled between central extents of the corresponding arcuate supports such that the vertical brushes of the inboard brush assemblies each abut a side of a corresponding one of the annular flanges of the water treatment tank, each inboard brush assembly further including a rectangular horizontal brush having a T-shaped support having a first end coupled to a rear face thereof and a pair of opposed ends coupled to central extents of the arcuate supports of an associated pair of vertical brushes such that the horizontal brush abuts the upper surface of the water treatment tank within one of the channels.

2. An apparatus for cleaning a water treatment tank comprising:

a water treatment tank including an upper surface with a circular configuration and a peripheral lip coupled to an outer periphery of the upper surface and extending upwardly therefrom, the upper surface having a plurality of annular flanges coupled thereto in concentric relationship therewith and extending upwardly therefrom for defining a plurality of concentric channels;

a frame support including a vertically oriented post mounted at a central extent of the upper surface of the water treatment tank and extending upwardly therefrom and a horizontally oriented arm having an inboard end coupled to the post;

a guide assembly having a mount including an angled member having a first end fixedly coupled to an outboard end of the arm of the frame support and a second end extending upwardly and radially outward therefrom, a horizontal member having a first end fixedly coupled to the second end of the angled member and extending radially outward in parallel relationship with the arm of the frame support and further extending within an outer guide coupled adjacent to the peripheral lip of the water treatment tank such that the guide assembly being prevented from being hindered by debris, a wheel rotatably coupled to a second end of the horizontal member of the guide assembly about a horizontal axis, wherein the wheel is rotatable within the outer guide of the water treatment tank for supporting the arm as it rotates about the post of the frame support;

an outboard brush assembly including a rod coupled to an outboard end of the arm of the frame support and extending downwardly and radially outward therefrom, a vertically oriented brush coupled to a second end of the rod for cleaning an inner surface of the peripheral lip of the water treatment tank; and a plurality of inboard brush assemblies for cleaning the flanges of the water treatment tank.

3. An apparatus for cleaning a water treatment tank as set forth in claim 2 wherein inboard brush assemblies each include a pair of vertical brushes at a common elevation adapted to abut opposite sides of the flanges.

4. An apparatus for cleaning a water treatment tank as set forth in claim 2 wherein each inboard brush assembly further includes a horizontal brush for cleaning the upper surface of the water treatment tank within the channels.

5. An apparatus for cleaning a water treatment tank as set forth in claim 4 wherein inboard brush assemblies each include a pair of vertical brushes adapted to abut opposite sides of the flanges, wherein the horizontal brush of each inboard brush assembly is coupled to the vertical brushes via a T-shaped support.

6. An apparatus for cleaning a water treatment tank as set forth in claim 2 wherein a spring is connected between the rod of the outboard brush assembly and the arm of the frame support for urging the brush of the outboard brush assembly against the peripheral lip of the water treatment tank.

7. An apparatus for cleaning a water treatment tank as set forth in claim 2 wherein the outer guide includes an interior space and a slot through which the mount of the guide assembly extends.

8. An apparatus for cleaning a water treatment tank as set forth in claim 2 and further including a guide assembly which is connected to the arm of the frame support and further supported by the water treatment tank at an elevation above the arm of the frame support.

* * * * *